US012116103B2

(12) United States Patent
Leidich et al.

(10) Patent No.: US 12,116,103 B2
(45) Date of Patent: *Oct. 15, 2024

(54) REUSABLE BALLOON SYSTEM

(71) Applicant: URBAN SKY, Denver, CO (US)

(72) Inventors: Jared Leidich, Denver, CO (US); Andrew F. Antonio, Denver, CO (US); Mitch Sweeney, Alvin, TX (US); Daniel W. McFatter, Tucson, AZ (US); Maxmillion James West McLaughlin, Fort Myers, FL (US)

(73) Assignee: URBAN SKY, Denver, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/481,852

(22) Filed: Oct. 5, 2023

(65) Prior Publication Data
US 2024/0034452 A1     Feb. 1, 2024

Related U.S. Application Data

(63) Continuation of application No. 17/828,455, filed on May 31, 2022, now Pat. No. 11,814,151, which is a continuation of application No. 17/200,280, filed on Mar. 12, 2021, now abandoned, which is a continuation of application No. 17/014,851, filed on Sep. 8, 2020, now Pat. No. 10,953,975.

(Continued)

(51) Int. Cl.
*B64B 1/62*     (2006.01)
*B64B 1/40*     (2006.01)
*B64B 1/64*     (2006.01)
*B64D 17/80*    (2006.01)
*G05D 1/00*     (2006.01)

(52) U.S. Cl.
CPC ............. *B64B 1/62* (2013.01); *B64B 1/40* (2013.01); *B64B 1/64* (2013.01); *B64D 17/80* (2013.01); *G05D 1/105* (2013.01)

(58) Field of Classification Search
CPC .... B64B 1/04; B64B 1/40; B64B 1/58; B64B 1/62; B64B 1/64; B64B 1/66; B64D 17/80; G05D 1/105
See application file for complete search history.

(56) References Cited

U.S. PATENT DOCUMENTS 3,614,031 A * 10/1971 Demboski ................. B64B 1/48
                                                        244/32
6,234,425 B1 * 5/2001 Rand ......................... B64D 1/12
                                                      244/137.4

(Continued)

FOREIGN PATENT DOCUMENTS

FR     2970940 A1     8/2012

*Primary Examiner* — Tye William Abell
(74) *Attorney, Agent, or Firm* — HOLZER PATEL DRENNAN

(57) ABSTRACT

An example reusable high-altitude balloon system includes a balloon with a first end supporting a payload and a second end with an aperture and an apex fitting that is positioned within the aperture. A clamp applies a pressure to a plurality of pleated folds formed in the perimeter of the aperture around the apex fitting to form an air-tight seal against the balloon at the perimeter of the aperture. The reusable high-altitude balloon system further includes control circuitry that controllably releases the apex fitting from the balloon to initiate a descent sequence.

20 Claims, 15 Drawing Sheets

Related U.S. Application Data

(60) Provisional application No. 63/040,378, filed on Jun. 17, 2020, provisional application No. 62/897,075, filed on Sep. 6, 2019.

(56) References Cited

U.S. PATENT DOCUMENTS

| | | | | |
|---|---|---|---|---|
| 9,745,040 | B1* | 8/2017 | Hall-Snyder | B64B 1/40 |
| 9,908,607 | B1* | 3/2018 | Fourie | B64B 1/58 |
| 2015/0266560 | A1* | 9/2015 | Ratner | B64B 1/62 |
| | | | | 244/99 |
| 2015/0298786 | A1* | 10/2015 | Stigler | B64C 39/024 |
| | | | | 244/30 |
| 2016/0059951 | A1* | 3/2016 | Brookes | B64B 1/62 |
| | | | | 244/98 |
| 2016/0083068 | A1* | 3/2016 | Crites | B64B 1/14 |
| | | | | 244/31 |
| 2016/0167761 | A1* | 6/2016 | Roach | B64B 1/58 |
| | | | | 156/60 |
| 2016/0207605 | A1* | 7/2016 | Jensen | B64B 1/40 |
| 2016/0288894 | A1* | 10/2016 | Sehnert | B64B 1/30 |
| 2017/0057607 | A1* | 3/2017 | Knoblach | G01S 5/12 |
| 2019/0009928 | A1* | 1/2019 | Crites | B29C 66/43 |

* cited by examiner

REUSABLE BALLOON SYSTEM

CROSS REFERENCE TO RELATED APPLICATIONS

The present application is a continuation of U.S. patent application Ser. No. 17/828,455 entitled "Reusable Balloon System, and filed on May 31, 2022, which is a continuation of U.S. patent application Ser. No. 17/200,280 entitled "Reusable Balloon System" and filed on Mar. 12, 2021, which is a continuation of U.S. patent application Ser. No. 17/014,851, now issued as U.S. Pat. No. 10,953,975, entitled "Reusable Balloon System", filed on Sep. 8, 2021, which claims priority to U.S. Provisional Patent Application No. 62/897,075, titled Reusable Balloon System, and filed on Sep. 9, 2019 and also to U.S. Provisional Patent Application No. 63/040,378, titled "Reusable Balloon System," and filed on Jun. 17, 2020. All of these applications are hereby incorporated by reference for all that they disclose or teach.

BACKGROUND

High-altitude balloons are typically filled with helium, hydrogen, methane, or any mixture of those gasses or other gasses where the resulting mixture is lighter than air. High-altitude balloons may be outfitted to carry electronics equipment such as transmitters, navigation systems, GPS receivers, and cameras, and are often used in industries such as weather modeling, aerial imaging, and data collection for various types of scientific experimentation. Although earth-orbiting satellites may be adapted to provide the same science as high-altitude balloon systems, the comparatively low cost of balloon system equipment, ease of balloon launch, reduced stringency of flight regulations, and temporary nature of balloon flights make ballooning an appealing alternative.

For safety and environmental protection, some governmental bodies such as the Federal Aviation Administration (FAA) provide regulations imposing requirements for reliable termination. To comply with such regulations, high-altitude balloons are typically equipped with primary and secondary (e.g., fail-safe) flight termination mechanisms. Current flight termination mechanisms are designed to initiate descent by damaging the balloon, such as by tearing a large hole in the body of the balloon. Consequently, most all high-altitude balloons are used a single time and destroyed during descent. In addition, it is often the case that a balloon carcass may separate from a payload during a flight termination sequence and land in a different location. This increases costs of recovery efforts and also increases risks to the public due to the existence of multiple objects, rather than a single object, falling from the sky. Still other balloon systems include balloons that are made of environmentally-adverse materials such as latex or rubber which are most commonly not recovered. Upon termination such a balloon typically explodes or shreds into multiple pieces, creating substantial litter that is most typically not recovered. The foregoing limitations increases costs and thereby decreases the viability of using high-altitude balloons to perform routine data collection operations.

The weight of a balloon envelope is of great importance to a high altitude balloon system, as it significantly contributes to the overall weight and size of the system. A heavy system requires more lift gas and, therefore, a larger balloon envelope volume. These considerations have led to the practice of constructing balloon envelopes from very thin material that are, consequently, typically very fragile. This fragility limits the wind velocity that a balloon can be launched in because high winds can damage or tear the envelope at launch. The thin fragile material is often not able to survive a descent and recovery, which limits the lifetime of most of these balloon envelopes to one-time-use—a practice that is complementary to the inclusion of the aforementioned balloon termination mechanisms that also destroy the balloon envelope.

SUMMARY

A reusable high-altitude balloon system disclosed herein includes at least a payload and a control system configured to initiate a flight termination sequence by separating the payload from a first end of the balloon. Separation of the payload from the first end of the balloon causes the balloon to invert and release lift gas from within the balloon without destroying the balloon envelope. The lift gas is release through a vent duct also used to arrest the ascent of the balloon.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. These and various other features and advantages will be apparent from a reading of the following Detailed Description.

BRIEF DESCRIPTIONS OF THE DRAWINGS

DETAILED DESCRIPTION

The technology disclosed herein provides high altitude balloon system features that promote usability and reduce flight recovery costs. Over the last decade, stronger lightweight materials have become commercially available. The herein proposed designs provide for high-altitude balloon designs with balloon envelopes constructed from such materials that can perform useful science while greatly improving the state of the art via reusability and durability. A balloon made of a strong material can be launched in higher winds than a balloon made of a weak material. It can also be terminated in a non-destructive way that preserves the envelope and keeps all parts of the aircraft together during descent minimizing hazards imposed on the National Airspace System (NAS) and to bystanders on the ground. Additionally, stronger balloon envelopes reduce the strain on the world's resources by reducing the total amount of material that gets discarded every flight, and by keeping latex, polyethylene and other harmful materials out of nature where they are often left as litter.

As discussed above, existing flight termination mechanisms are either designed to destroy or inadvertently damage the balloon envelope. To promote reusability of the aforementioned balloon envelopes with increased durability, the disclosed technology also provides for novel flight termination and landing mechanisms designed to protect the balloon envelope.

According to one implementation, a reusable balloon system includes a flight termination mechanism that initiates a descent and landing sequence without causing damage to the balloon carcass. In the same or another implementation, the balloon carcass and payload remain attached to one another throughout the descent and landing sequence such that they may be jointly recovered and the entire system reused, substantially without repair, on a subsequent flight.

Figure 1A:
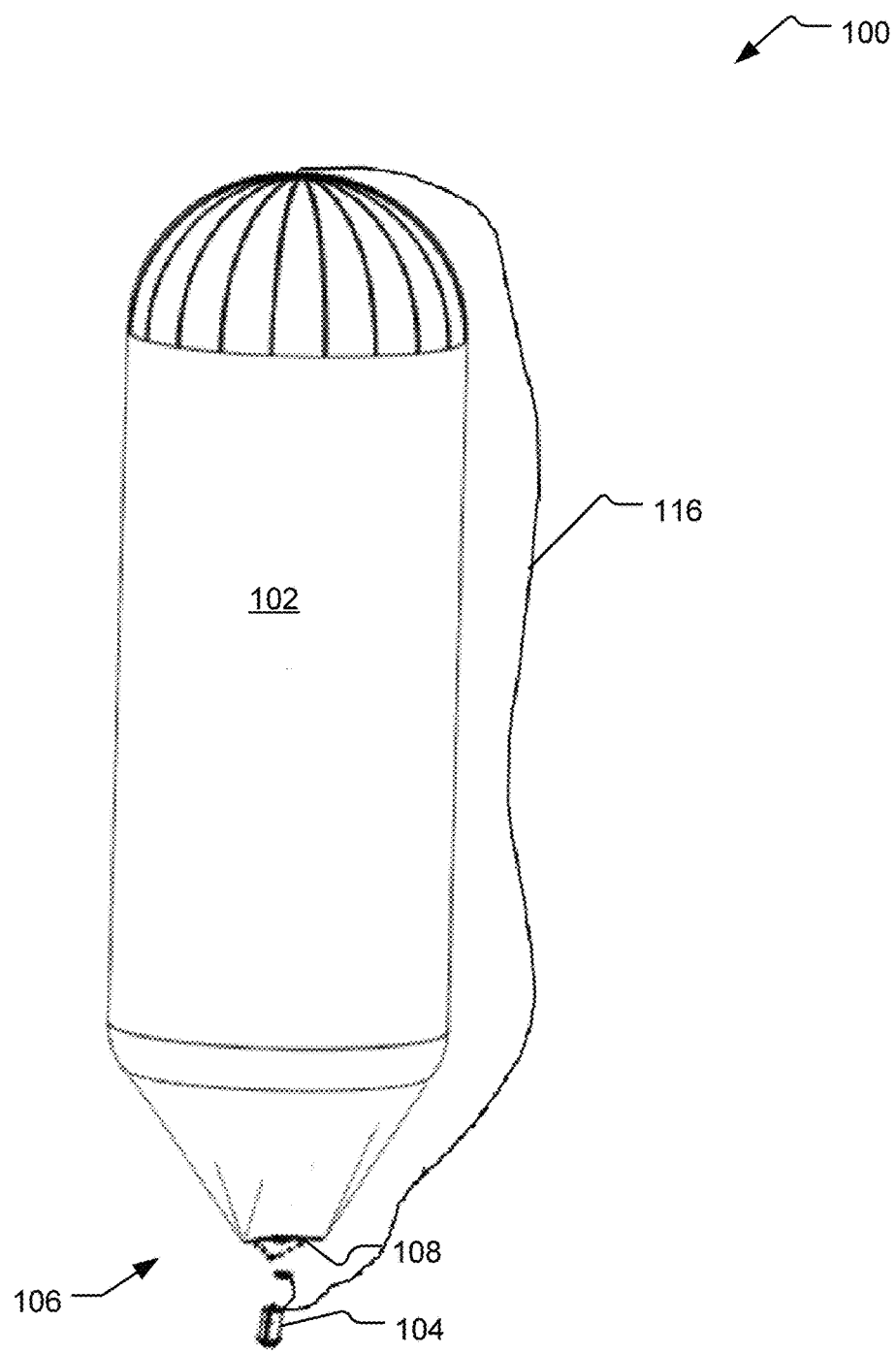
FIG. 1A illustrates the reusable balloon system inflated during flight at the onset of a flight termination sequence above the Earth's surface.

FIG. 1A-1D illustrate exemplary steps in a flight termination sequence of a reusable balloon system 100. FIG. 1A illustrates the reusable balloon system 100 during an initial phase of a flight termination sequence in which a mass is selectively released from a balloon body 102. In the examples disclosed herein, the mass that is released is a payload 104. However, the disclosed flight termination sequence could, in other implementations, be initiated by releasing any mass in the same manner as that described with respect to payload 104. When the balloon body 102 is filled with a lighter-than-air gas such as hydrogen or helium, the reusable balloon system 100 is lifted above Earther's surface to a target flight altitude, such as to the Earth's lower stratosphere.

In different implementations, the payload 104 may be equipped with different electronic devices to allow the reusable balloon system 100 serve a variety of different purposes. In one implementation, the reusable balloon system 100 is used for weather modeling. Balloons move with the wind; thus, tracking location of a balloon may facilitate modeling of wind speed and direction. In such case, the payload 104 may include a GPS receiver in addition to instruments for measuring temperature and barometric pressure. In another implementation, the reusable balloon system 100 is used for remote sensing, such as aerial imaging, aerial scanning, hyperspectral imaging, thermal imaging, infrared imaging, and/or any other activity for which a high vantage point is advantageous to the type of data being collected. Notably, the reusable balloon system 100 may also be well-suited for short duration missions that are frequently re-launched, such as a data gathering mission where the amount of data collected by the reusable balloon system 100 is too large to downlink, necessitating the landing and relaunch of the system to download the data and clear memory devices.

A variety of different types of balloon systems may be suitable for the herein disclosed technology. In one implementation, the balloon 102 is designed to fly in a configuration known in the industry as a "zero pressure configuration." A balloon designed to fly in a zero pressure configuration expels lift gas (e.g., hydrogen or helium) through a vent upon reaching a target altitude, causing the balloon to stop ascending and hover for a period of time such as for a few hours or up to a few days. The length of time that the balloon 102 hovers at the target altitude may be tailored by a flight engineer via design constructs such as volumetric size, gas type, and other features. To facilitate the venting of lift gas at the target altitude, the balloon 102 may include a vent duct 108 on a first end 106 (e.g., an earth-facing side during flight) of the balloon 102. The vent duct 108 remains unsealed or loosely sealed, such that building pressure may further open the vent duct to allow lift gas to escape.

In another implementation, the balloon 102 is designed to fly in a configuration known as a "super-pressure configuration." In a super pressure configuration, the balloon 102 is entirely sealed during flight. As the balloon ascends, pressure inside of the balloon 102 increases, therefor increasing the density of the lift gas, and this building pressure eventually causes the balloon to stop ascending when the lift gas is the same density as the surrounding air, at which time internal pressure stops building, allowing the balloon to fly for a predefined period of time at a target altitude. In one super-pressure configuration that utilizes a flight termination sequence similar to that shown in FIG. 1A-1D, a vent duct exists on the first end 106 of the balloon 102; however, this duct remains sealed throughout the flight of the balloon 102 up until initiation of the flight termination sequence, at which time the vent duct is selectively unsealed to release the lift gas in a manner consistent with that described below.

In either of the above-described configurations, the reusable balloon system 100 may include a same or similar a primary flight termination mechanism that initiates a descent sequence. The primary flight termination mechanism may be either remotely activated, such as via a command signal transmitted from the ground or from a satellite, and/or automatically activated (e.g., preprogrammed) such that the reusable balloon system 100 self-initiates the flight termination sequence. When the primary flight termination mechanism is activated, the payload 104 is caused to separate from the first end 106 of the balloon 102. In FIG. 1A, the payload 104 is illustrated at a moment just following detachment from the lower end 106 of the balloon body 102.

Figure 1B:
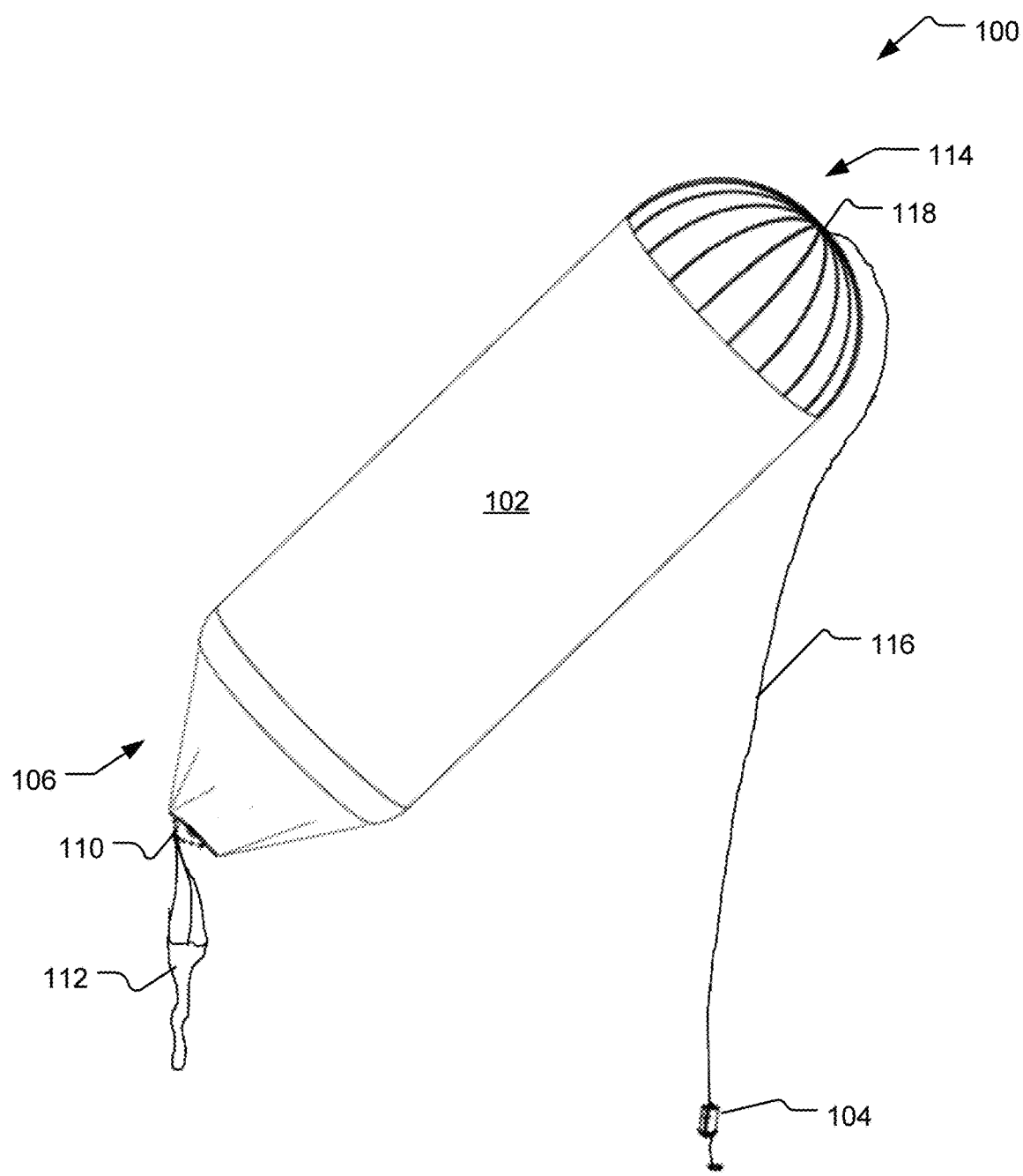
FIG. 1B illustrates the reusable balloon system of FIG. 1A during a payload separation phase of a flight termination sequence.

FIG. 1B illustrates the reusable balloon system 100 of FIG. 1A beginning to rotate following release of the payload 104 during the flight termination sequence. In one implementation, the payload 104 separates from the first end 106 of the balloon 102 by detaching from suspension arms 110 that remain attached to the balloon 102. In another implementation, the payload 104 and the suspension arms 110 remain attached to one another but jointly detach from the first end 106 of the balloon 102. In either above-described scenario, the payload 104 drops away from the first end 106 of the balloon 102 but remains attached to a second end 114 of the balloon 102 by a tether 116. The tether 116 may take on different forms in different implementations, such as that of a cord, chain, wire, etc. As the payload 104 swings away from the first end 106 of the balloon 102, the weight of the payload 104 and the tether 116 apply a tension to a tether attachment point 118 on the balloon 102 which is, in the illustrated example, located on the second end 114 of the balloon that faces away from Earth during flight. This tension initiates an inversion of the balloon 102 in which the first end 106 and second end 114 flip in position relative to the ground below. During this phase, a parachute 112 drops from a stow position between the payload 104 and the balloon 102 with tethers attached to the lower end 106 of the balloon 102.

Figure 1C:
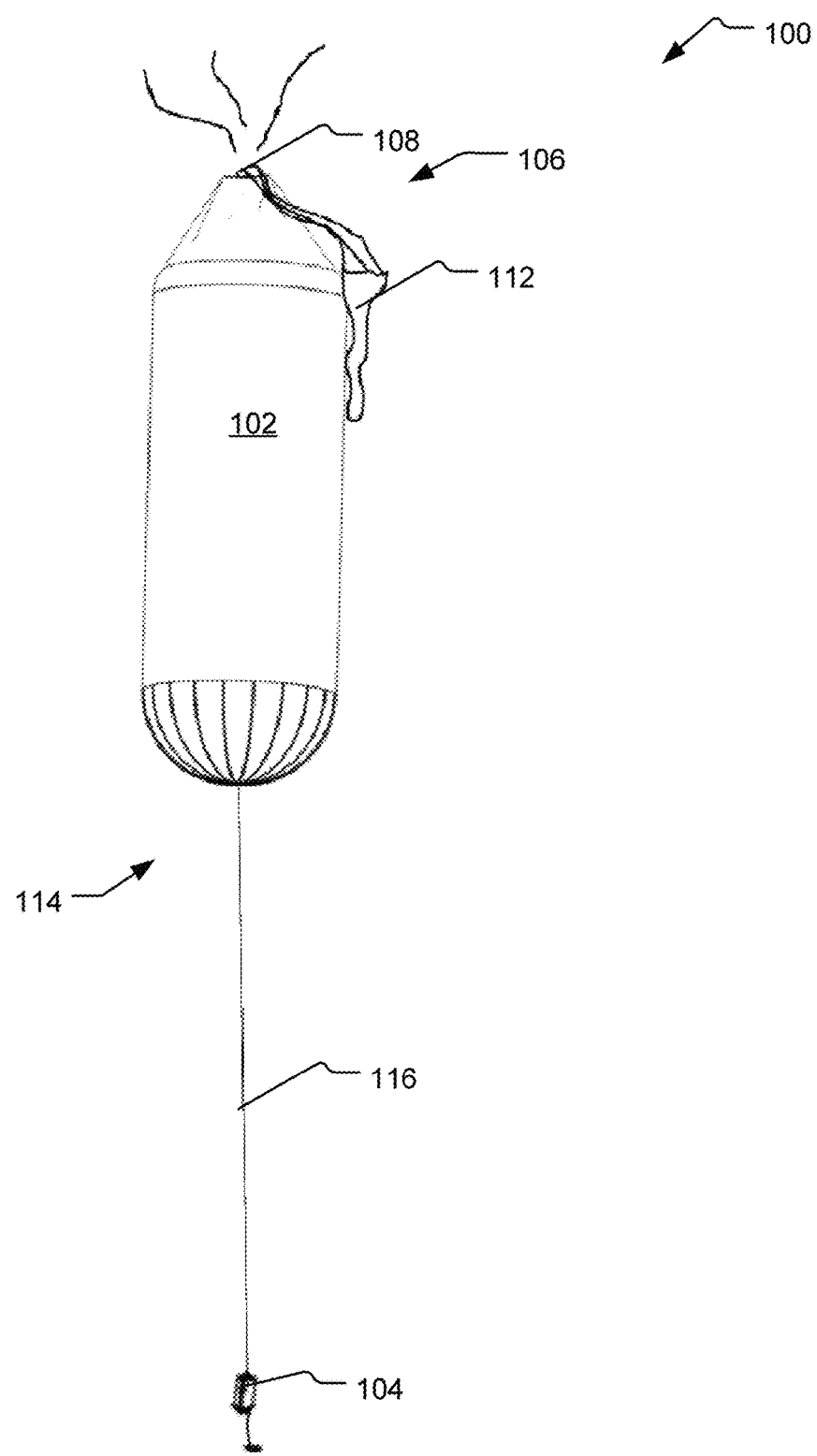
FIG. 1C illustrates the reusable balloon system of FIG. 1A-1B during an inversion phase of the flight termination sequence.

FIG. 1C illustrates exemplary inversion of the reusable balloon system 100 that results from the rotation described above with respect to FIG. 1B. Specifically, the first end 106 (initially facing downward, toward Earth) has rotated 180 degrees and now faces upward (away from Earth. The payload 104 remains attached to the second end 114 of the balloon 102 via the tether 116. The balloon 102 remains in this inverted orientation throughout the duration of the flight termination (landing sequence).

In an implementation where the balloon 102 flies in a zero pressure configuration (e.g., with an earth-facing vent duct unsealed during flight), the inversion of the balloon 102 generates internal pressure on the vent duct 108 on the first end 106, further opening the vent duct 108 and thereby allowing the lift gas to rapidly escape. In an implementation where the balloon 102 flies in a super-pressure configuration, the flight termination sequence may include an additional step that includes releasing a sealed duct on the first end 106 such that the vent gas may rapidly escape (as shown) once reaching the illustrated position.

Because the gas in the balloon body 102 is lighter than air and therefore buoyant, the lighter than air gas vents out of the vent duct 108 as shown. In this sense, the vent duct 108 that may vent gas during ascension and/or normal flight of the balloon acts as a release duct during the flight termination sequence. The venting of the lift gas through the vent duct 108 allows the reusable balloon system 100 to begin to descend.

Figure 1D:
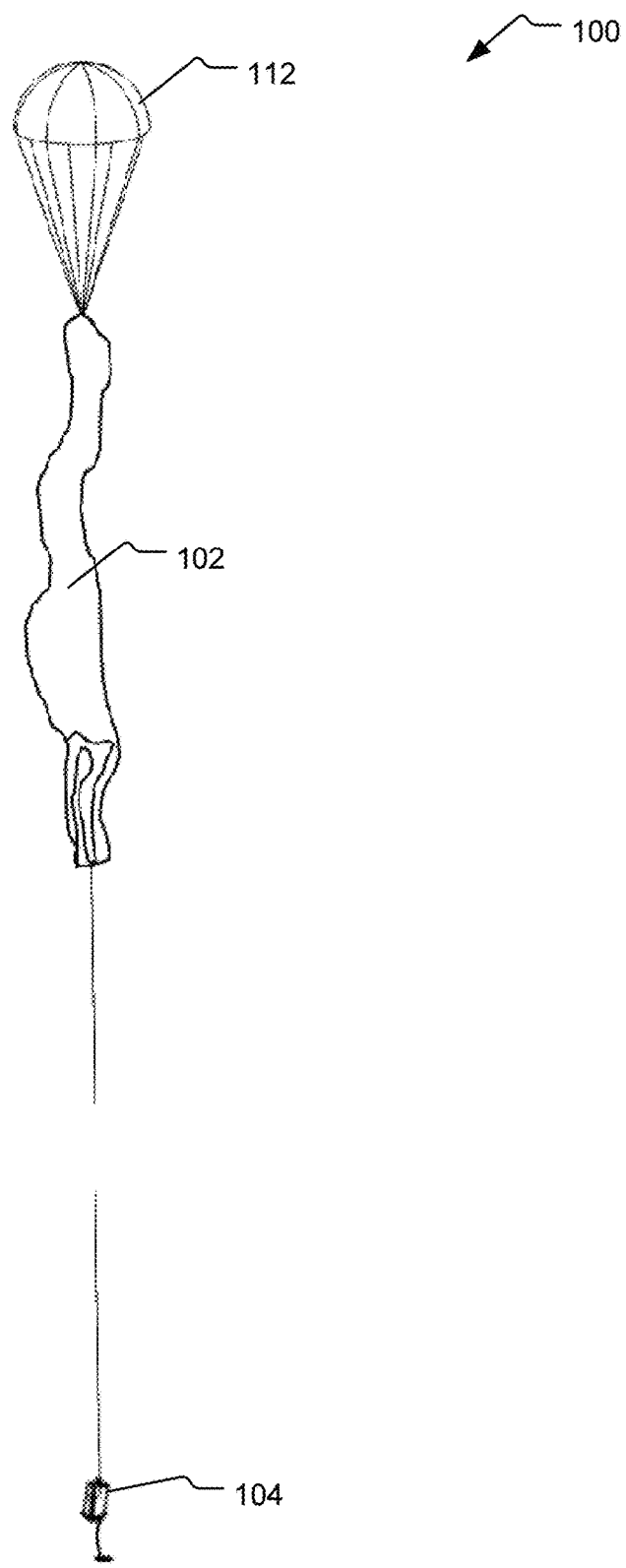
FIG. 1D illustrates the reusable balloon system of FIG. 1A-1C following a parachute deployment phase of the flight termination sequence.

FIG. 1D illustrates an exemplary parachute deployment phase of a flight termination sequence that occurs once the balloon 102 has rotated 180 degrees responsive to separation of the payload 104 from the second end 114. As the lift gas vents through the opening at the first end 106 which is now facing away from earth, the parachute 112 opens under force of the free-falling system, slowing and controlling the descent of the balloon 102 such that the reusable balloon system 100 may land safely without damage. As the reusable balloon system 100 descends, the parachute 112 inflates, acting as a traditional aerodynamic decelerator. The payload 104, balloon 102, and parachute 112 remain attached throughout the remainder of the landing sequence such that all three components may be jointly recovered from a single landing location.

In FIG. 1D, the parachute 112 is shown to be a typical round parachute; however, other implementations may utilize any type of parachute that slows the descent of the system with respect to the surrounding air. In at least one implementation, the reusable balloon system 100 utilizes a steerable parachute that can fly horizontally.

Figure 2:
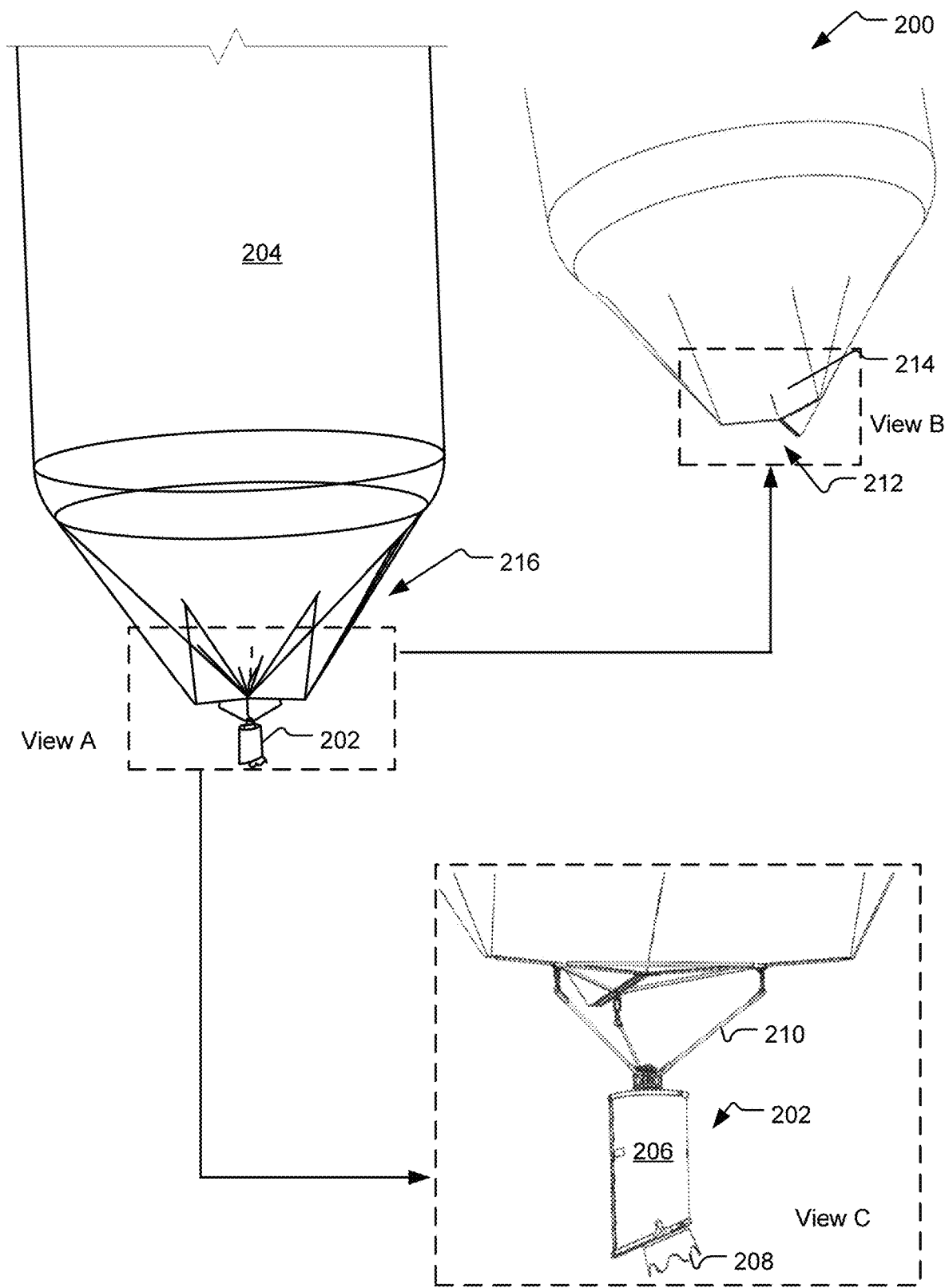
FIG. 2 illustrates aspects of another example reusable balloon system.

FIG. 2 illustrates aspects of another example reusable balloon system 200. The system is shown to include at least a payload 202 attached to a balloon body 204. In some implementations, a lower end 216 of the balloon body 204 includes a vent duct. For example, a lower end 216 of the balloon body 204 remains open or loosely sealed such that lift gas can escape while the balloon is in flight.

In the illustrated implementation, the lower end 216 of the balloon body 204 is shown to have a folded flap configuration 212. For example, the folded flap configuration 212 may be created by bringing together several points in the lower end 216 of the balloon body 204 to create flaps (e.g., a flap 214) as shown. In this configuration, each different one of the flaps may serve as a linkage point that forms a coupling with a corresponding one of multiple suspension arms 216 securing the payload 202 to the balloon body 204.

In one implementation where the reusable balloon system 200 flies in a zero-pressure configuration, the flaps not used as points of attachment to the suspension arms 216 are left unsecured such that lift gas can escape through these flaps when the reusable balloon system 200 has ascended to a target altitude. In this configuration, the unsecured folds in the lower end 216 of the balloon body 204 serve as the aforementioned vent duct that may vent the lift gas during nominal flight operations as the reusable balloon system 200 ascends to a target altitude. This is one example of a zero-pressure configuration. In other implementations that also fly the reusable balloon system 200 in a zero-pressure configuration, the lower end 216 of the balloon body 204 may include any suitable tuck, fold, or releasable seal configuration that provides for release of the lift gas. During a flight termination sequence, the balloon body 204 inverts (e.g., as described with respect to FIG. 1A-1D) and the vent duct acts a release duct.

In an implementation where the reusable balloon system 200 is designed to fly in an superpressure configuration, the lower end 216 of the balloon body 204 may be designed to remain sealed throughout nominal flight operations. At the time that the balloon body 204 inverts (e.g., via a 180 degree rotation) during the flight termination sequence, a vent on the lower end 216 of the balloon body 204 is opened to serve as a release duct, as generally described with respect to FIG. 1A-1D.

Referring to View C, the reusable balloon system 200 is shown to further include a payload 202 secured to the balloon body 204 via suspension arms 216. A different one of the suspension arms 216 attaches to each of the three folds in the folded flap configuration 212.

By example and without limitation, the payload 202 is shown to include a cannister 206 supporting a camera 208. For example, the camera 208 may be designed to facilitate imaging of Earth's surface. According to one implementation, the payload 202 includes avionics equipment usable to control a rotation and separation hub (not shown) to cause the cannister 206 and camera 208 to rotate relative to suspension arms 210 and the balloon body 204. For example, the rotation of the cannister 206 may be robotically controlled to perform actions in accord with a pre-loaded or read-time command sequence, such to rotate the camera 208 to image large swaths of the earth while the reusable balloon system 200 moves across the sky.

According to one implementation, the avionics equipment within the cannister 206 also controls a primary flight termination mechanism for the reusable balloon system 200. For example, the avionics equipment generates a control signal that causes the payload 202 to detach from the suspension arms 210 so as to initiate the flight termination sequence illustrated with respect to FIG. 1A-1D. Although not shown in FIG. 2, the cannister 206 is, in one implementation, secured to an upper (opposite) end of the balloon body 204 via a tether, such as in the manner shown with respect to FIG. 1B.

Figure 3:
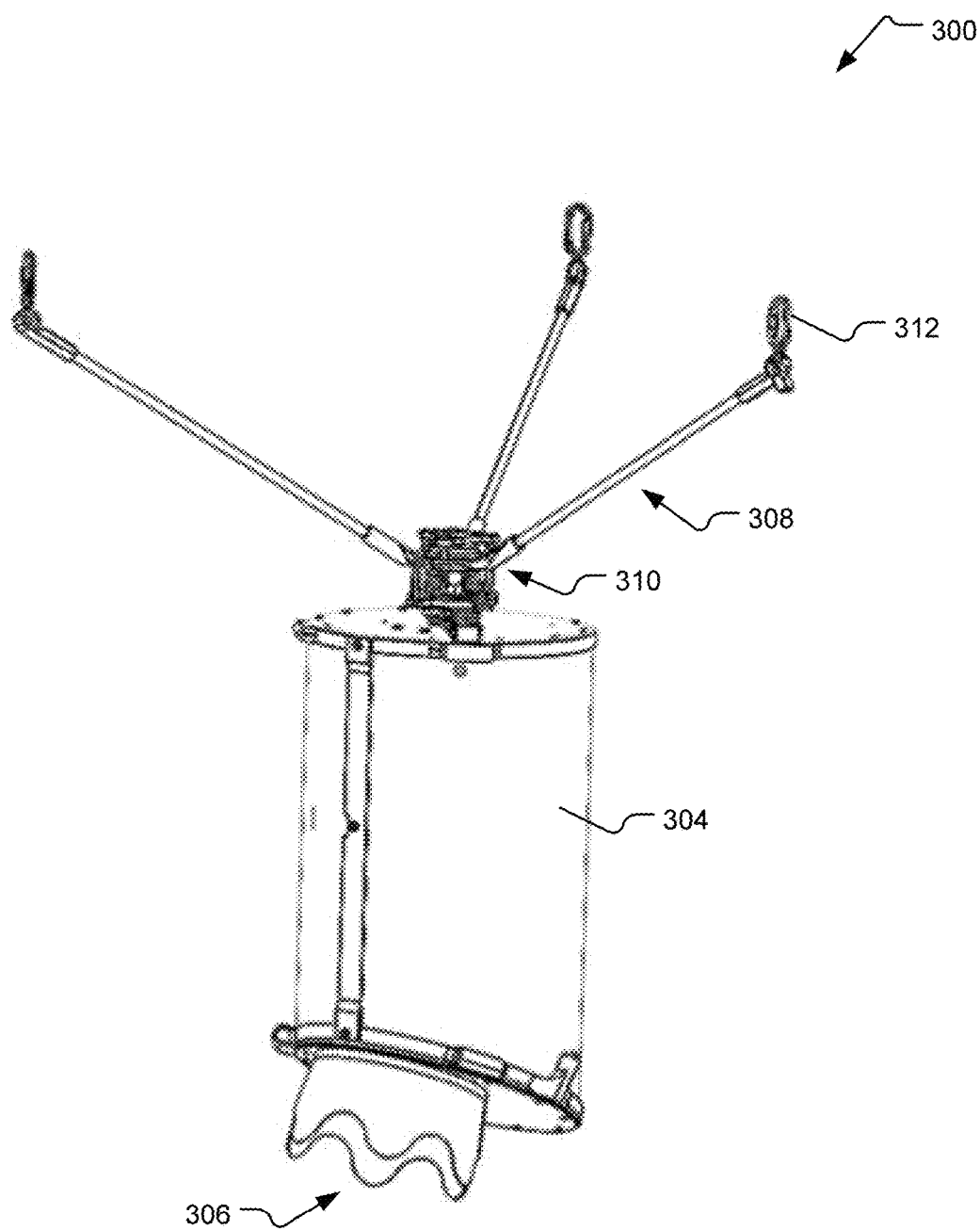
FIG. 3 illustrates an example payload suitable for implementation in a reusable balloon system.

FIG. 3 illustrates an example payload 300 suitable for implementation in a reusable balloon system. The payload 300 has features the same or similar to those shown and described with respect to FIG. 2. The payload 302 includes a cannister 304 that includes a camera 306 and other avionics equipment. Suspension arms 308 attach the payload 302 to a balloon body. In the illustrated implementation, the suspension arms 308 include three arms that each include an attachment link (e.g., an attachment link 312) that secures the associated arm to a portion of the balloon body (not shown). Ends of the suspension arms 308 opposite the attachment links 312 connect to a separation and rotation hub 310. In one implementation, the separation and rotation hub 310 rotates the cannister 304 during nominal flight operations to controllably alter a field-of-view of on-board sensing equipment.

The suspension arms 308 may assume different forms in different implementations. When spread out such that the suspension arms 308 have an attachment footprint wider than the separation and rotation hub 310, the side-to-side sway of the cannister 304 is mitigated, stabilizing the payload 300

The payload 300 is designed to detach from the balloon body during a flight termination sequence. Although such detachment may be achieved in a variety of different ways, at least one implementation provides for detachment of the payload 302 from the suspension arms 308 at the separation and rotation hub 310, as described further with respect to FIG. 4, below.

Figure 4:
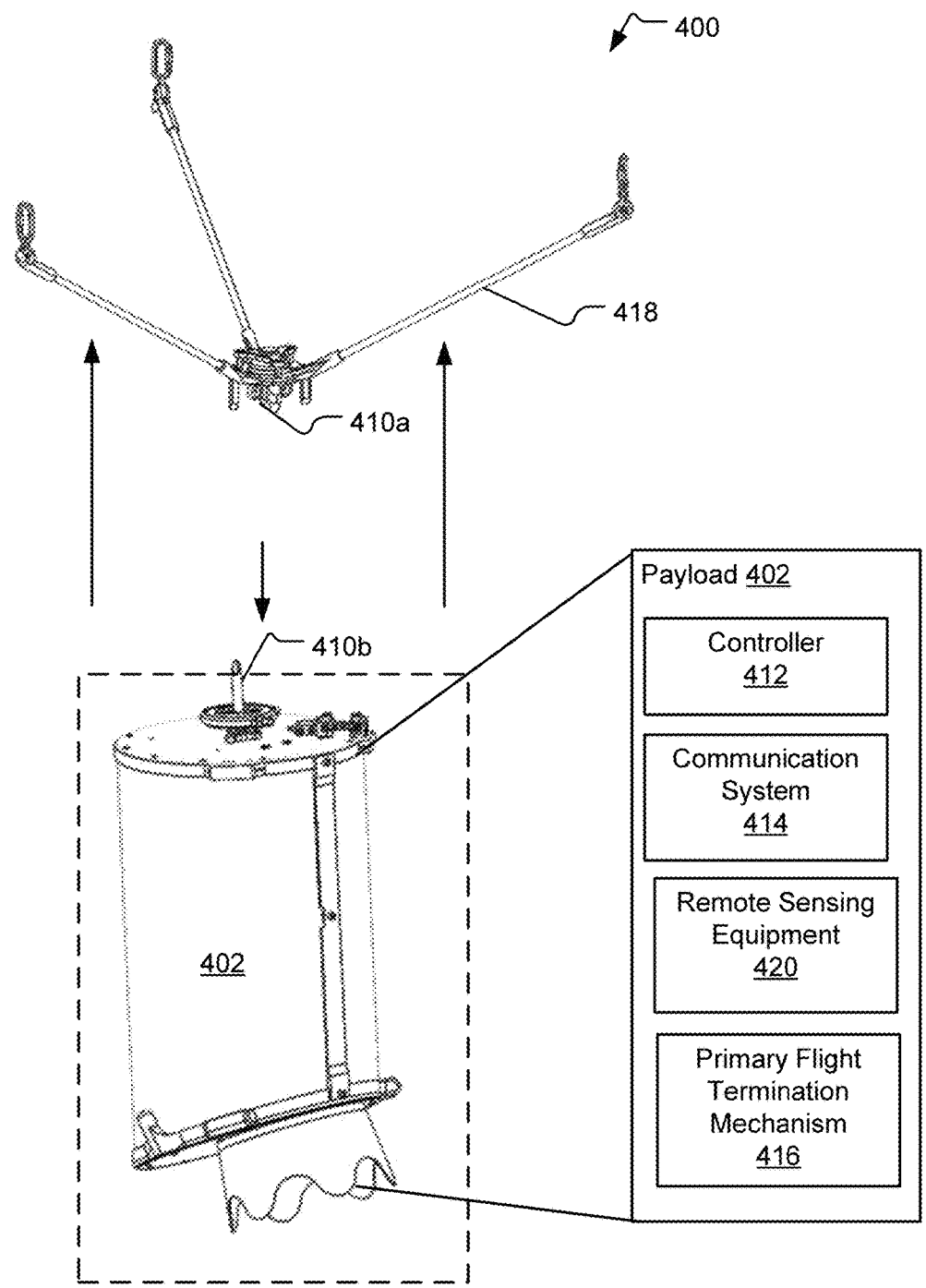
FIG. 4 illustrates further aspects of a reusable balloon system that including a payload that separates from suspension arms during a flight termination sequence.

FIG. 4 illustrates further aspects of a reusable balloon system 400 that includes a payload 402 designed to separate from suspension arms 404 during a flight termination sequence, such as in the manner the described above with respect to FIG. 1A-1D.

As shown in View B, the payload 402 includes various electronics, sensing, and communication equipment. Among various other on-board electronics, the payload 402 includes a controller 412 which may be understood as including hardware and/or software. In one implementation, the controller includes memory, computer-executable instructions, and one or more processors (e.g., microprocessors), peripheral interface controllers ("PICs"), application-specific integrated circuits ("ASICs"), systems on chips ("SoCs"), etc. The controller 412 may be pre-loaded with commands sequences and/or configured to receive and execute real-time commands using a communication system 414.

The controller 412 may be configured to execute firmware sequences to perform various operations in response to execution of pre-loaded commands (e.g., at designated timestamps) and/or responsive to receipt of commands received in real time, such as from a ground system or satellite network. In addition to collecting data with remote sensing equipment 420 (e.g., performing science operations), the controller 412 also controls detonation of a primary flight termination mechanism 416.

In one implementation, the controller 412 executes the primary flight termination mechanism 416 responsive to receipt of a real-time command RF command. In another implementation, the controller 412 executes the primary flight termination mechanism 416 responsive to satisfaction of certain conditions such as upon expiration of a flight timer, at a preselected time, or when a location of the reusable balloon system satisfies predefined criteria.

Although the operational principles of the primary flight termination mechanism 416 may vary from one implementation to another, detonation of the primary flight termination mechanism 416 causes the payload 402 to detach from the balloon body (not shown) of the reusable balloon system 400. In the specific implementation shown, the separation occurs at a hub including an upper portion 410a and a lower portion 410b. The hub (410a, 410b) connects suspension arms 418 to the payload 402 and may also serve to rotate the payload 402 relative to the suspension arms 418 during flight.

It should be understood that the payload separation may be achieved in a variety of ways without departing from the scope of this disclosure. However, in one implementation, the payload is released by a physically severing (cutting) a cord, wire, or other line to cause the upper portion 410a of the hub to separate from the lower portion 410b of the hub. For example, controller 412 may execute the primary flight termination mechanism 416 by increasing current flow to a hotwire cutter that melts a cord (not shown) securing the two portions of the hub together.

Figure 5:
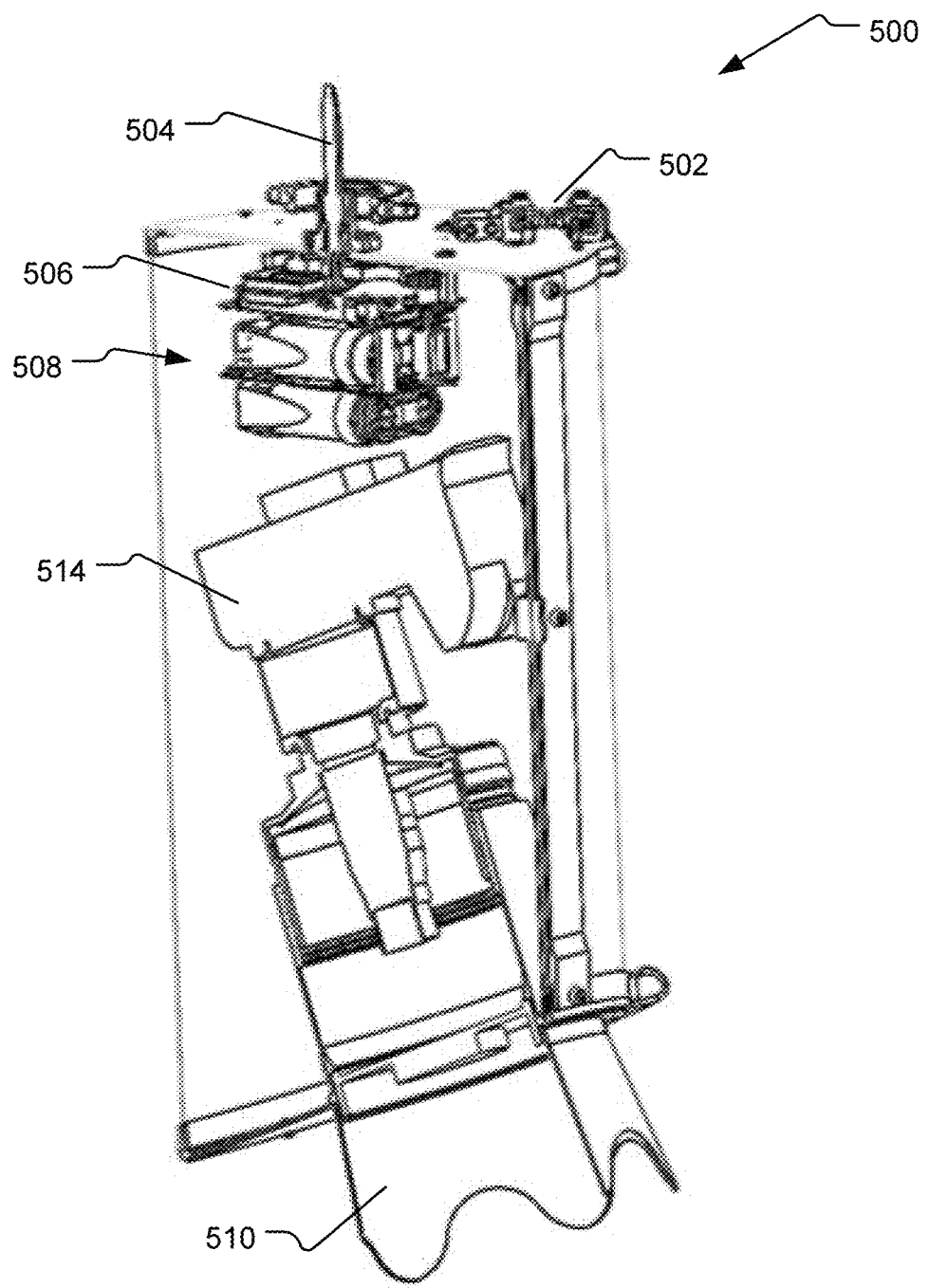
FIG. 5 illustrates an example payload that may be designed to detach from a balloon body during a flight termination sequence of a reusable balloon system implementing the herein disclosed technology.

FIG. 5 illustrates an example payload 500 that may be designed to detach from a balloon body during a flight termination sequence of a reusable balloon system implementing the herein disclosed technology. The payload 500 includes a cutting assembly 502 that may be controlled to selectably sever a support line (e.g., wire or cord) connecting the payload 500 to a balloon body (not shown). When the cutting assembly 502 is controlled to sever the support line during flight of the reusable balloon system, a lower part of a hub 504 drops away form an upper part (not shown) of a hub that remains attached to the balloon body, at which time the payload 500 begins a brief free fall away from the remainder of the system.

In one implementation, the payload 500 remains attached to an upper end of the balloon body even after the above-described separation from the lower end of the balloon body. For example, the payload 500 may be attached to a tether line that wraps around the balloon body and attaches to a top end (e.g., an end facing away from Earth during flight). Thus, free fall of the payload 500 tensions the tether line and causes the balloon to invert, such as in the manner described above with respect to FIG. 1A-1D.

By example and without limitation, the payload 500 is shown to include other equipment such as a camera 514 with a lens internal to a lens hood 510 as well as a battery pack 508 and various avionics equipment 506 (e.g., a control board).

Figure 6:
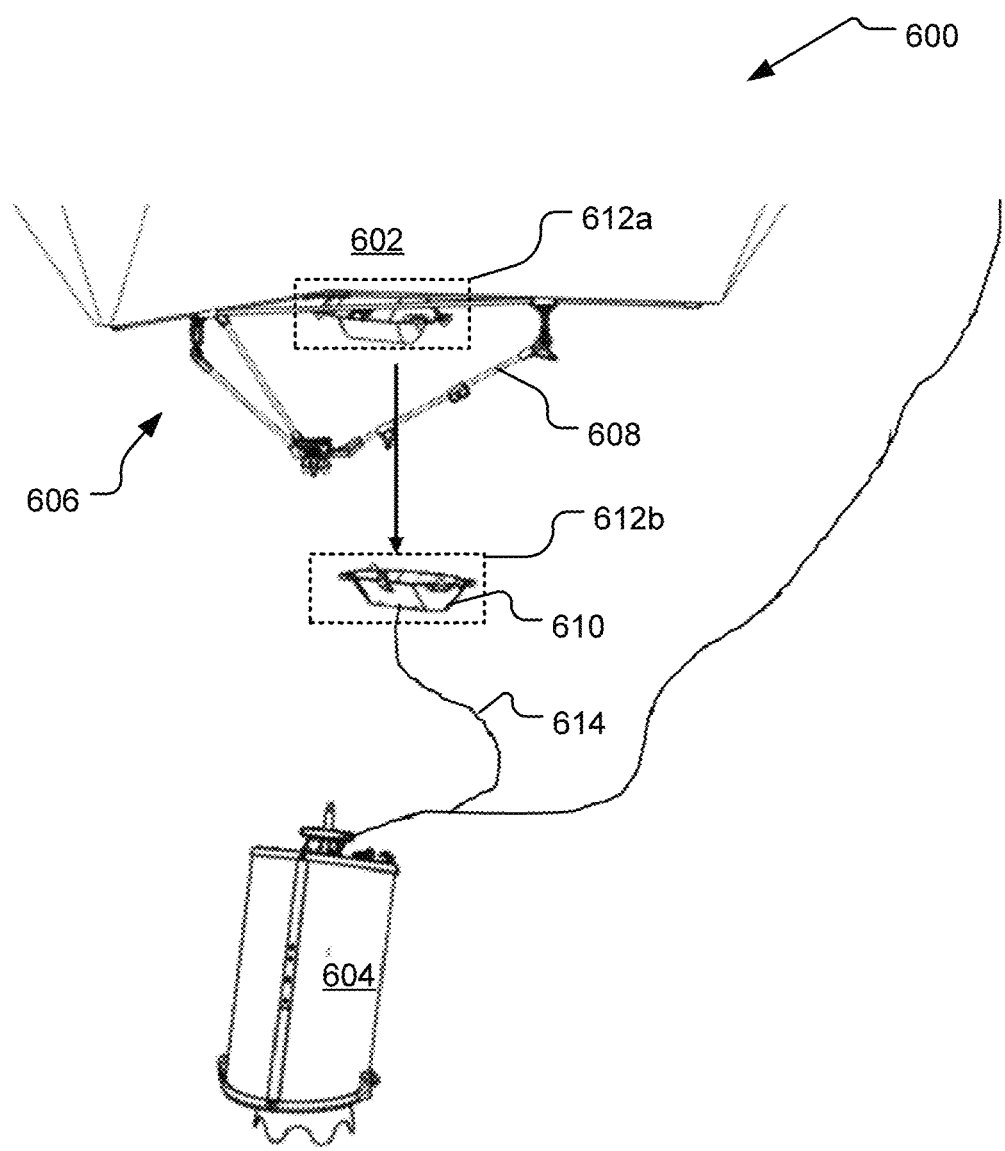
FIG. 6 illustrates further details of an exemplary payload detachment step during a flight termination sequence for a reusable balloon system.

FIG. 6 illustrates further details of an exemplary payload detachment step during a flight termination sequence for a reusable balloon system 600. A payload 604 is selectively released from a lower end 606 of a balloon body 602, such as in a manner consistent with the descriptions of FIG. 1-6. In one implementation, the payload 604 is, during flight, connected to a parachute cover 610 via an attachment mechanism 614 (e.g., a tether). As the payload 604 drops away from suspension arms 608, the weight of the payload 604 tensions the attachment mechanism 614, pulling the parachute cover 610 off of a parachute (not shown) that is stowed between the suspension arms 608 and the balloon body 602. For example, the parachute and parachute cover 610 are initially stowed together in the position 612a and the removal of the parachute cover 610 frees the parachute to hang from this position, as generally shown and described above with respect to FIG. 1B. The parachute cover 610 remains attached to the payload 604 and falls away with the payload 604 as shown (e.g., at a free-falling position 612b). This release of the parachute from the stowed position allows for its subsequent deployment during the impending free-fall, as shown and described above with respect to FIG. 1D.

Figure 7:
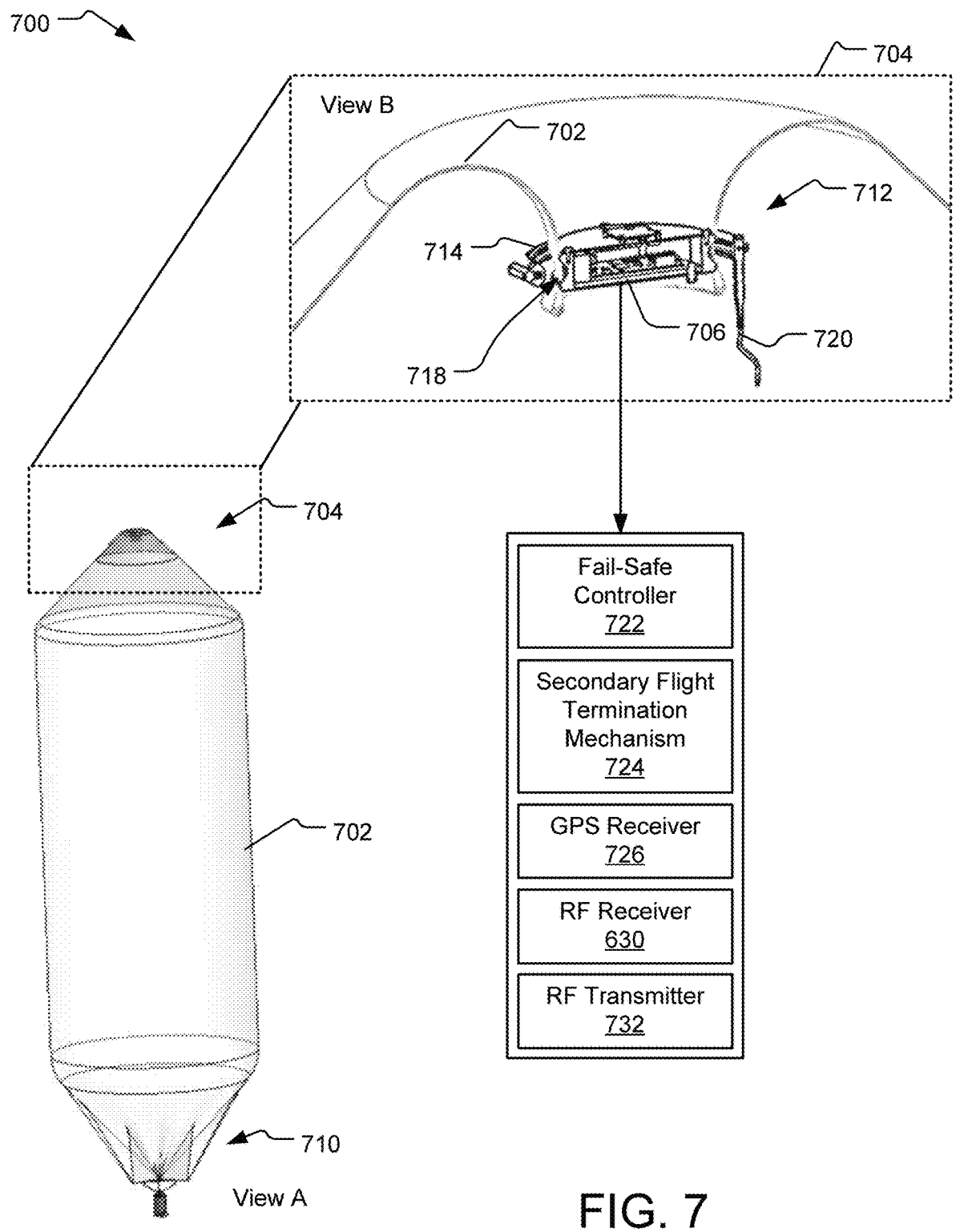
FIG. 7 illustrates other exemplary aspects of a reusable balloon system.

FIG. 7 illustrates other exemplary aspects of a reusable balloon system 700. Specifically, aspects of the reusable balloon system 700 described with respect to FIG. 7 provide for a secondary flight termination mechanism that may be used in lieu of a primary flight termination mechanism such as that described above with respect to FIG. 1A-1D.

The reusable balloon system 700 includes a balloon body 702 with an upper end 704 secured in a manner referred to herein as a plug seal 712. By design, the envelope of the balloon body 702 has an opening at the upper end 704. The aperture of this opening in the balloon body 702 is fitted around an apex box 706 such that an air-tight seal exists between the apex box 706 and the envelope of the balloon body 702. View B illustrates a cross-section of the apex box 706 and the air-tight seal formed between the apex box 706 and the aperture in the balloon body 702.

In different implementations, this plug seal 712 may be formed in a same or similar manner despite variable sizes in the size or shape of the aperture in the balloon envelope. Stated differently, it is not required that the vertical gores (fabric sections, panels) of the balloon body 702 have profiles of any particular shape. For example, the balloon profile could be rectangular, near-rectangular, cylindrical, etc. The aperture in the upper end 704 of the balloon body 702 could be circular, oval, rectangular, etc.

According to one implementation, the apex box 706 has an o-ring seal 718 around its outer perimeter. The plug seal 712 is formed by arranging fabric of the balloon body 702 around the o-ring seal 718 and locking the fabric in position by tightening a clamp ring 714 around the apex box 706 on an opposite side of the fabric. For example, a turn buckle may be used to tighten the clamp ring 714 against the o-ring seal 718 with the fabric of the balloon body 702 in between, as shown in FIG. 7.

In one example implementation, the plug seal is initially formed while the balloon body 702 is inside-out. After the plug seal 712 is formed, the envelope of the balloon body 702 is pulled down (e.g., folded back on itself), turning the balloon body 702 inside-out while pushing the plug seal 712 upward from the bottom of the balloon body 702 to the top of the balloon body 702.

In one implementation, the apex box 706 encases a fail-safe controller 722 (e.g., memory, microprocessor, and/or computer-executable instructions) adapted to execute a secondary flight termination mechanism 724. The term "secondary flight termination mechanism" is used interchangeably herein with the term "fail-safe flight termination mechanism" to refer to a redundant means of initiating a flight termination sequence effective to return the reusable balloon system 700 to Earth's surface. In general, a "fail-safe" or "secondary" termination mechanism is a flight termination mechanisms that is not preferred and that is executed responsive to satisfaction of certain predefined emergency conditions. For example, the predefined emergency conditions may be satisfied when a primary (preferred) flight termination mechanism fails or when conditions are such that the primary flight termination mechanism becomes unsuitable, such as when a rapid descent is desired (e.g., in a system for which the primary flight termination mechanisms initiates a comparatively slow descent).

In one implementation, the reusable balloon system 700 includes a primary flight termination mechanism the same or similar as that described with respect to FIG. 1A-1D and FIG. 4, whereby detonation triggers a release of a payload, inversion of the balloon body 702, and venting of lift gas through an opening in the lower end 710 of the balloon body 702 which is rotated to face away from earth during the inversion.

In contrast, selective detonation of the secondary flight termination mechanism 724 causes a release of the plug seal 712 that separates the apex box 706 from the balloon body 702 such that lift gas can rapidly escape from the upper end 704 of the balloon body 702. Notably, release of the plug seal 712 does not cause an inversion of the balloon body 702; rather, this release merely facilitates a rapid release of lift gas through the opening that is to remained plugged by the plug seal 712 throughout normal flight operations. In instances where the primary flight termination mechanism is successfully executed, the plug seal 712 may remain sealed (as shown) throughout the landing sequence of the reusable balloon system 700.

In different implementations, the secondary flight termination mechanism 724 releases the plug seal 712 in different ways. By example and without limitation, the secondary flight termination mechanism 724 of FIG. 7 includes a cutting mechanism 720 (e.g., a pyrotechnic cutter) that may be controlled to sever a cord that is used to tighten the clamp ring 714 around the o-ring seal 718 and apex box 706. When the cord is cut, the clamp ring 714 releases its grip on the apex box 706 such that the balloon envelope is freed from the interface between the two, allowing the apex box 706 and clamp ring 714 to drop down inside of the balloon body 702.

In different implementations, the fail-safe controller 722 may be adapted to execute the secondary flight termination mechanism 724 responsive to satisfaction of different criteria ("emergency conditions"). In one implementation, the emergency conditions are deemed satisfied when the reusable balloon system 700 crosses a predefined geofence boundary. For example, the fail-safe controller 722 is programmed to continuously monitor location data received from a GPS receiver 726 within the apex box 706. When the location data indicates that the reusable balloon system 700 has crossed a predefined geofence boundary, the fail-safe controller 722 automatically executes the secondary flight termination mechanism 724. In another implementation, the fail-safe controller 722 is programmed to execute the secondary flight termination mechanism 724 upon expiration of a timer or at a particular point in time.

In yet still another implementation, the apex box 706 further includes an RF receiver 730. Upon receipt of a flight termination command at the RF receiver 730, the fail-safe controller 722 executes the secondary flight termination mechanism 724.

In still another implementation, the apex box 706 transmits GPS location collected by the GPS receiver 726 to a ground system controller using RF transmitter 732. This allows the ground system controller to monitor the location of the reusable balloon system 700 and to selectably transmit a secondary flight termination detonation command when a location of the reusable balloon system 700 satisfies certain criteria, such as if the balloon drifts into foreign air space, is approaching a densely populated area where landing could potentially create a safety or property damage hazard, or otherwise undesirably drifts across a defined geofence boundary.

Depending upon system design, the apex box 706 may include fewer than all elements shown in FIG. 7. For example, the apex box 706 may lack the RF receiver 730 and/or the GPS receiver 726. Other aspects of the reusable balloon system 700 not specifically defined with respect to FIG. 7 may be assumed to be the same or similar to those described elsewhere herein.

Figure 8:
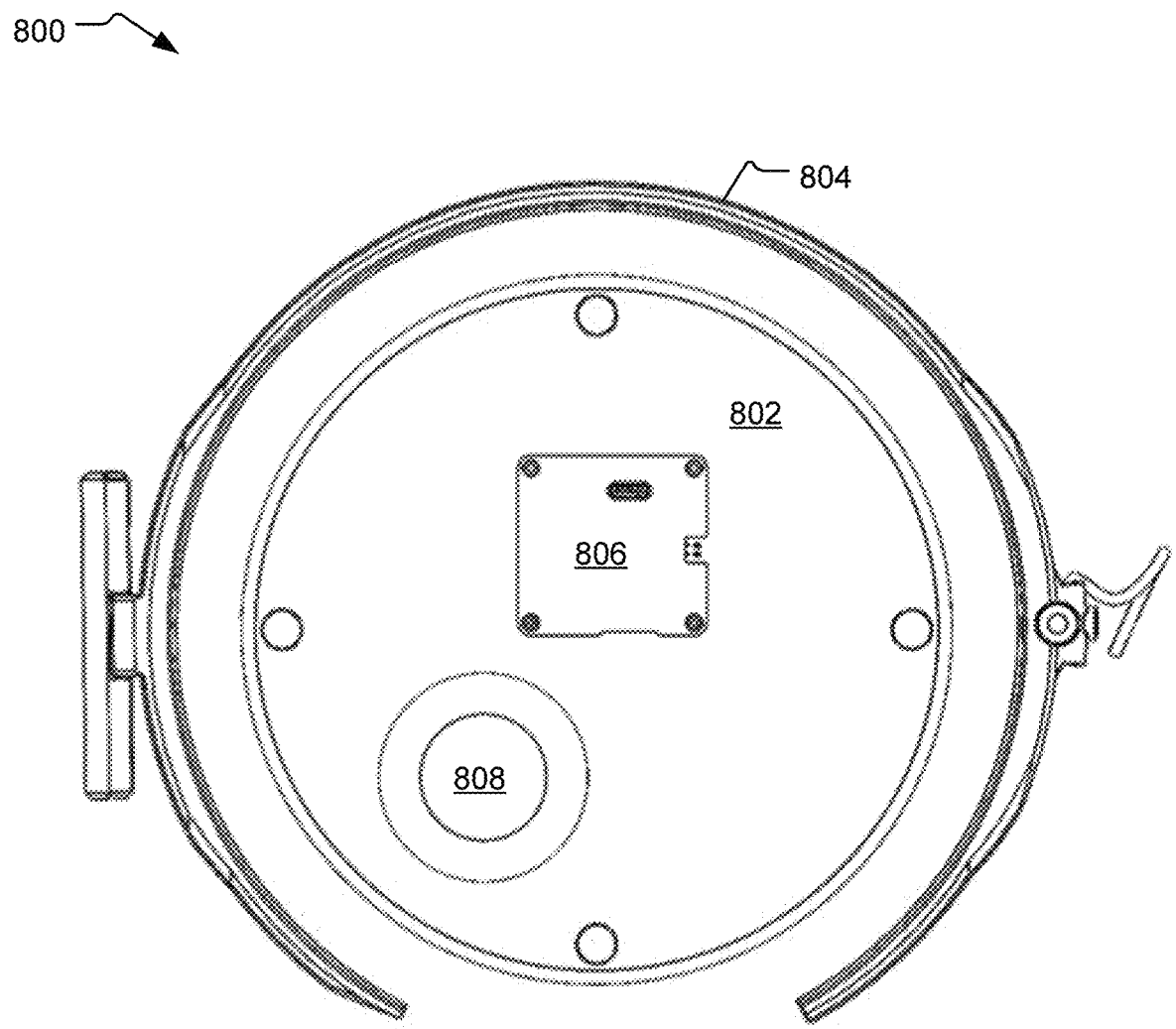
FIG. 8 illustrates a top-down view of an apex box and clamp ring that may form a plug seal that functions as a secondary flight termination mechanism within a reusable balloon system.

FIG. 8 illustrates a top-down view of an apex box 802 and clamp ring 804 that may be used to form a plug seal, such as according to the design discussed in detail with respect to FIG. 7. In this view, the clamp ring 804 is shown relaxed (not tightened) around the apex box 802. To form a plug sea as shown and described with respect to FIG. 6, balloon fabric is routed between the clamp ring 804 and the apex box 802, and the clamp ring 804 is tightened on the outside of the balloon fabric against the perimeter of the apex box 802. By example and without limitation, the apex box 802 is shown to include a communication system 806 and an antenna 808. In one implementation, the communication system 806 uses the antenna 808 to transmit location data to a ground station, such as to allow a ground-based human controller to monitor the location of the balloon system. Additionally, the antenna 808 and communication system 806 may receive commands sent from the ground to be executed by control electronics within the apex box 802. For example, a human ground-based controller may transmit a command that causes on-board control electronics to execute a secondary flight termination mechanism that releases the plug seal. Characteristics of the apex box 802 and/or the clamp ring 804 that are not described explicitly with respect to FIG. 8 may be assumed the same or similar to those discussed elsewhere herein with respect to like-named elements.

Figure 9:
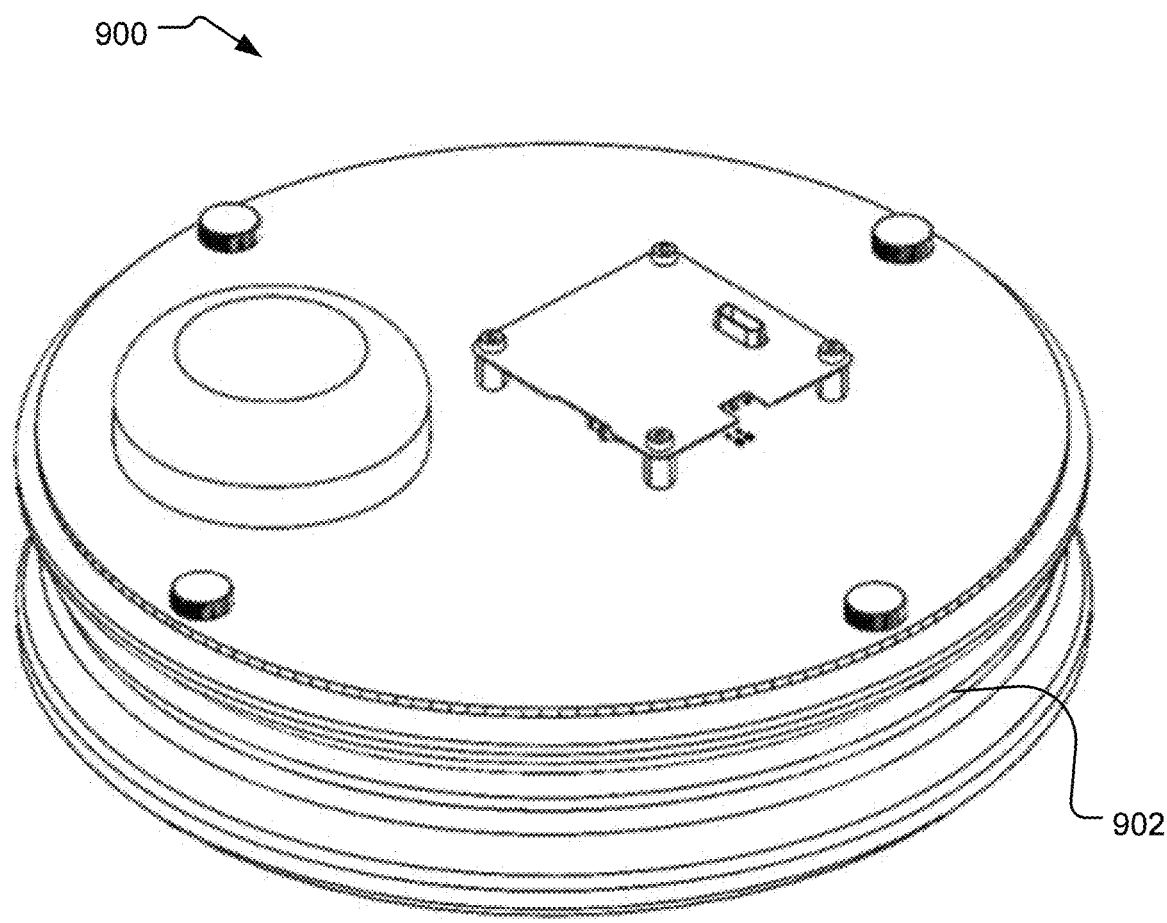
FIG. 9 illustrates a perspective view of an example apex box that may be used in conjunction with a clamp ring to form a plug seal that functions as a secondary flight termination mechanism within a reusable balloon system.

FIG. 9 illustrates a perspective view of an example apex box 900 that may be used in conjunction with a clamp ring (not shown) to form a plug seal that functions as a secondary flight termination mechanism within a reusable balloon system, such as according to the design discussed in detail with respect to FIG. 6. The apex box 900 includes a soft sealing surface 902, such as a rubber o-ring. When the apex box 900 is used to form a plug seal against a balloon envelope, fabric of the balloon envelope is clamped by the clamp ring against the soft sealing surface 902. Characteristics of the apex box 900 that are not described explicitly with respect to FIG. 9 may be assumed the same or similar to those discussed elsewhere herein with respect to like-named elements.

Figure 10:
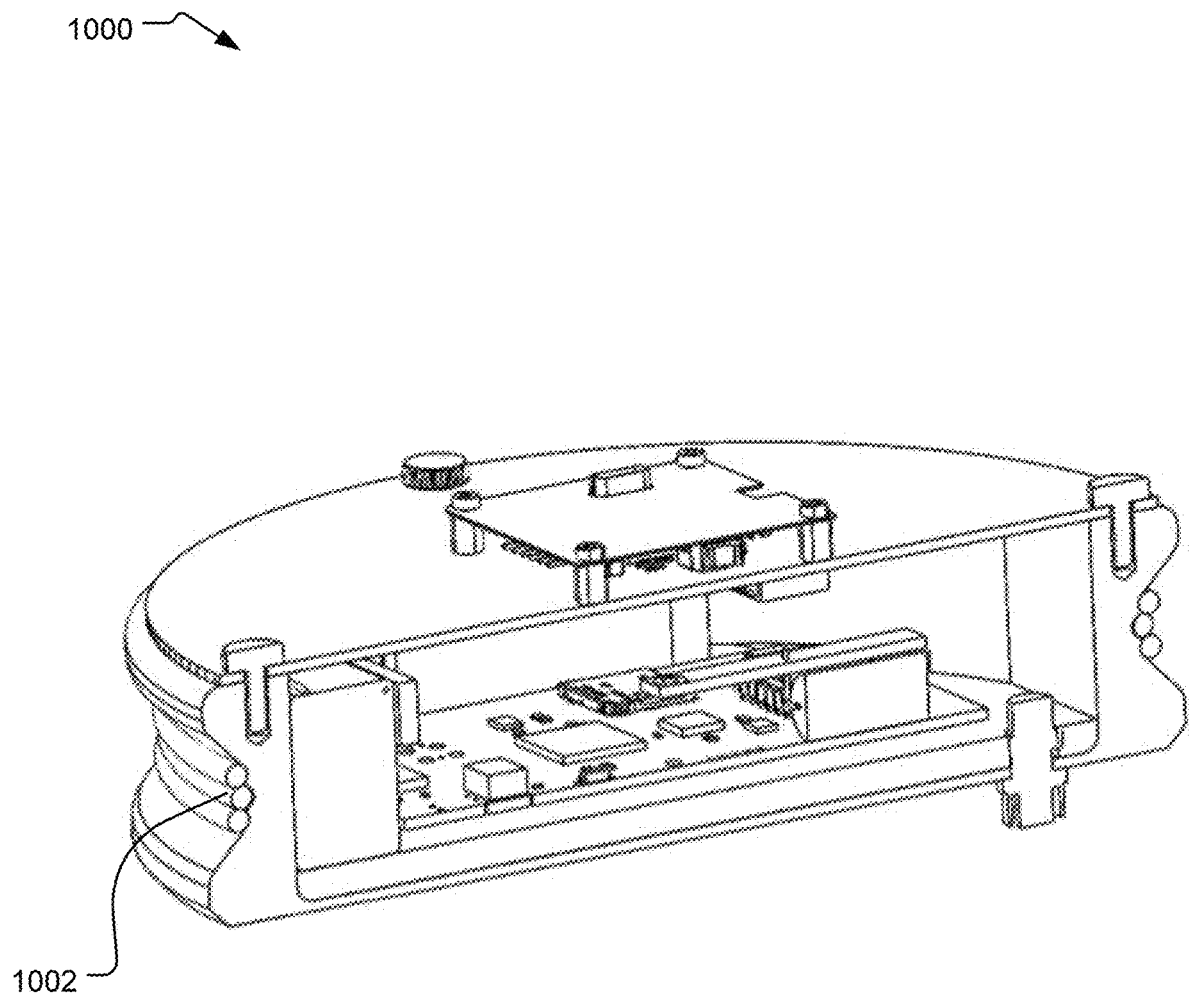
FIG. 10 illustrates a cross-sectional view of another example apex box that may be used in conjunction with a clamp ring to form a plug seal that functions as a secondary flight termination mechanism within a reusable balloon system.

FIG. 10 illustrates a cross-sectional view of another example apex box 1000 that may be used in conjunction with a clamp ring (not shown) to form a plug seal that functions as a secondary flight termination mechanism within a reusable balloon system, such as according to the design discussed in detail with respect to FIG. 6. A rubber o-ring 1002 wraps around a perimeter of the apex box 1000 and provides a soft sealing surface that may be clamped against fabric of a balloon envelope. A control board 804 is positioned within the apex box 1000. In one implementation, the control board 804 is coupled to a pyrotechnic cutter that severs a cord to release a plug seal, such as in the manner described above with respect to FIG. 7. Characteristics of the apex box 1000 that are not described explicitly with respect to FIG. 10 may be assumed the same or similar to those discussed elsewhere herein with respect to like-named elements.

Figure 11:
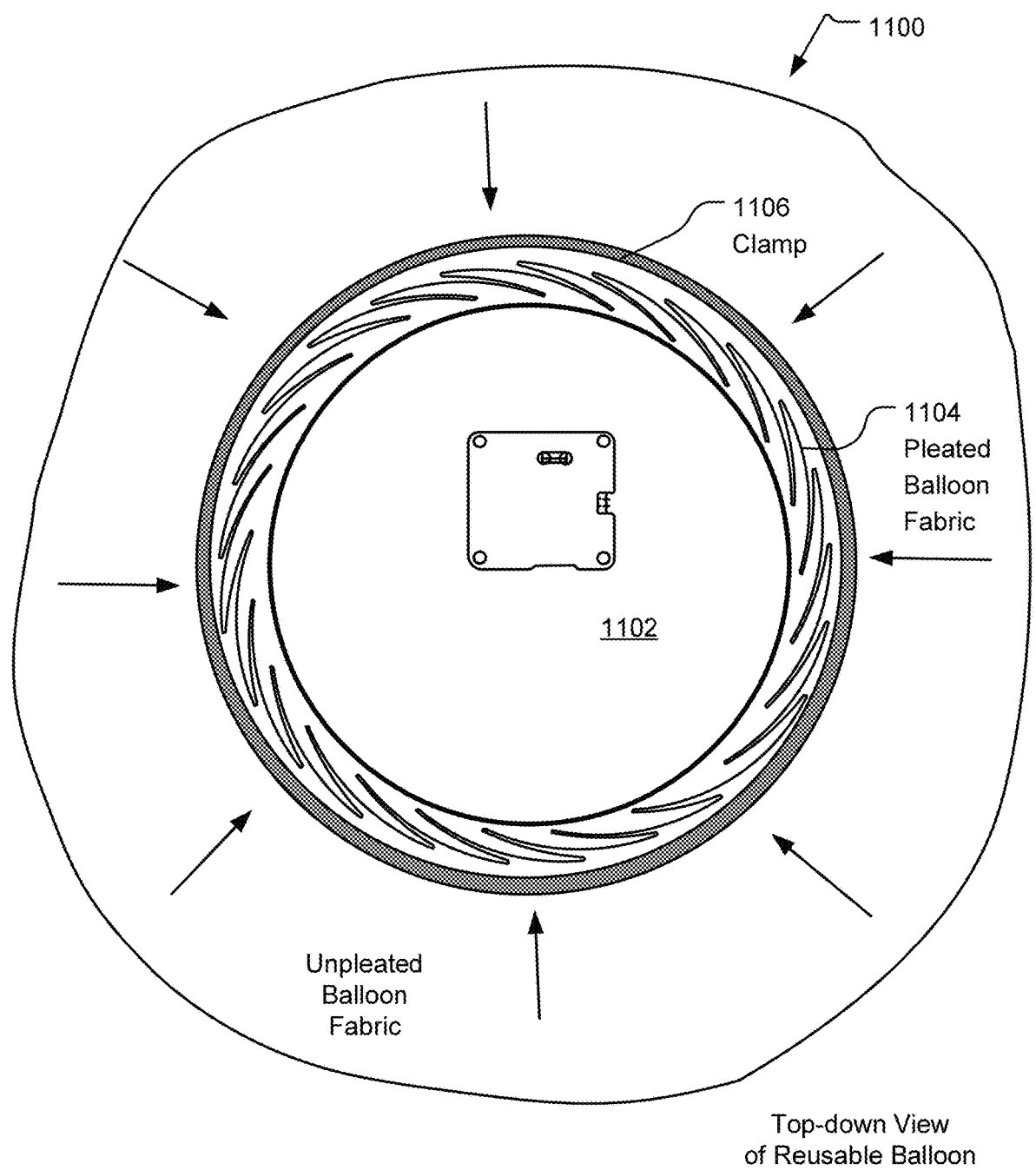
FIG. 11 illustrates a top-down view of an example plug seal that functions as a secondary flight termination mechanism within a reusable balloon system.

FIG. 11 illustrates a top-down view of an example plug seal 1100 that functions as a secondary flight termination mechanism within a reusable balloon system. The plug seal 1100 is formed by an apex box 1102 that is pressed against pleated fabric 1104 of a balloon envelope by a clamp ring 1106. To better illustrate the folds in the pleated fabric 1104, the clamp ring 1106 is shown in a relaxed position. When the clamp ring 1106 is tightened inward toward the center of the apex box 1102 (as indicated by arrows), an air-tight seal is created across the interface between the apex box 1102, pleated fabric 1104, and clamp ring 1106.

In FIG. 11, the pleated fabric 1104 is intended to represent fabric of the balloon envelope that has been pleated back and forth around the circumference of an aperture in the balloon envelope to form a continuous perimeter of folded pleats. These pleats are "pinched" in place against the apex box 1102 by the clamp ring. This pleating helps to ensure that the plug seal 1000 is airtight and symmetrical. Other aspects of the apex box 1102 or plug seal 1100 may be the same or similar to other implementations described herein.

Figure 12A:
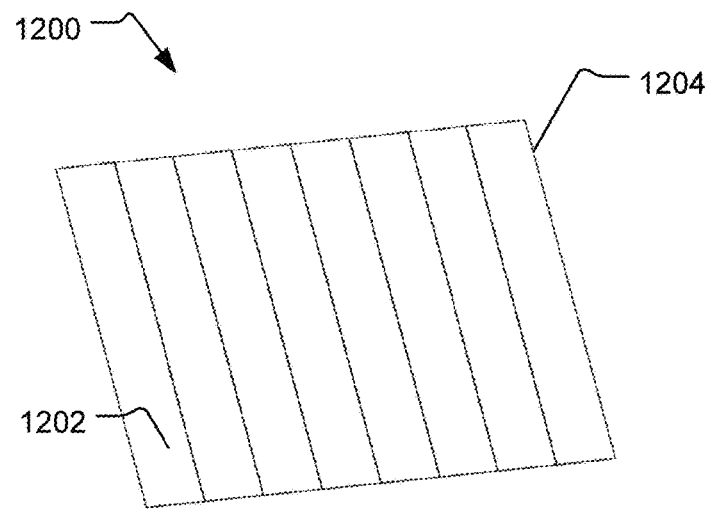
FIG. 12A illustrates a first exemplary balloon construction phase of a balloon suitable for use within a reusable high altitude balloon system.

FIG. 12A-12D illustrate various exemplary constructions phases of a reusable balloon suitable for use in the implementations disclosed herein. FIG. 12A illustrates a first exemplary balloon construction phase of a balloon suitable for use within a reusable high altitude balloon system. In this phase, multiple panels (e.g., a panel 1202) are attached together to make a large rectangle 1204. Although reusable balloon may be variety of shapes and sizes in different implementations, the large rectangle 1204 is, in one implementation ~35 long by ~35 feet tall. In different implementations, the panels (gores) of the reusable balloon may be made of different materials including without limitation durable coated fabrics such as reinforced polyethylene, coated ripstop nylon, or polyester, and/or any airtight material such as latex or polyethylene.

Figure 12B:
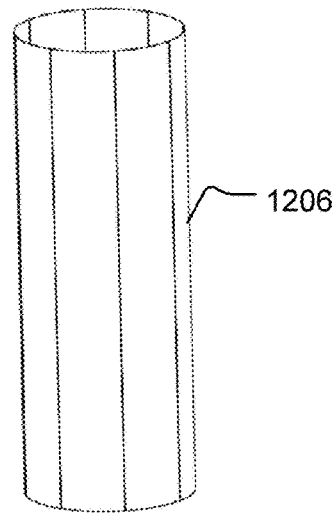
FIG. 12B illustrates another exemplary balloon construction phase of a reusable balloon following that shown in FIG. 12A.

FIG. 12B illustrates another exemplary balloon construction phase of a reusable balloon following that shown in FIG. 12A. In this phase, the large rectangle 1204 has been transformed into a cylindrical tube 1206 by attaching together two opposite sides. In one exemplary implementation, the large cylindrical tube 1206 is about 35 feet long and 12 feet in diameter.

Figure 12C:
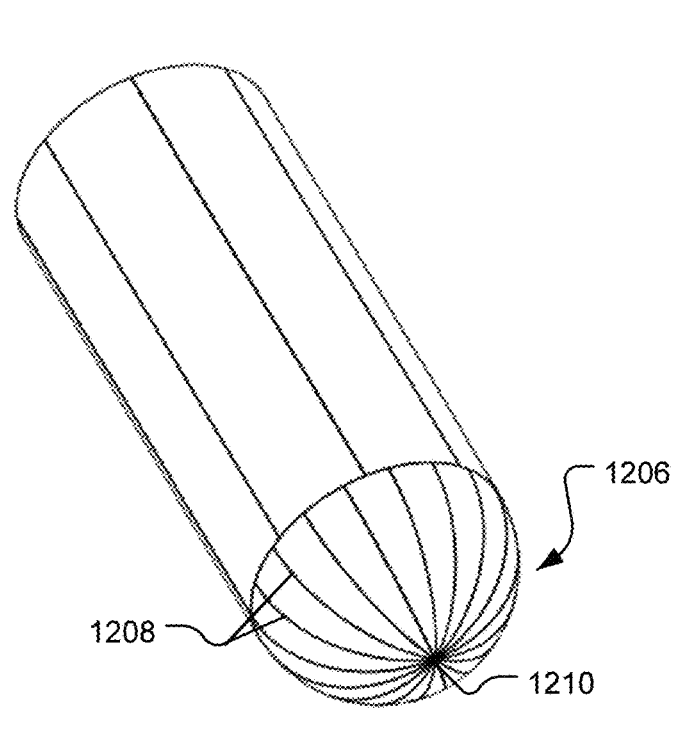
FIG. 12C illustrates still another exemplary balloon construction phase following that of FIG. 12B.

FIG. 12C illustrates still another exemplary balloon construction phase following that of FIG. 12B. Here, a first end 1214 of the cylindrical tube 1206 has been uniformly gathered inward such that a number of pleats 1208 are formed and the aperture is pulled shut to form a seal around an apex fitting 1210. In one implementation, the pleats 1208 are formed using a jig that includes a number of pins arranged in an annular pattern. For example, the jig may include a first inner circle of pins internal to a second outer circle of pins. The fabric of the reusable balloon body is woven back and forth between alternating inner and outer pins of the jig all around, and the pleats created via this technique are then clamped into place around the apex fitting 1210 to form a plug seal the same or similar to that shown and described with respect to FIG. 7-11.

Figure 12D:
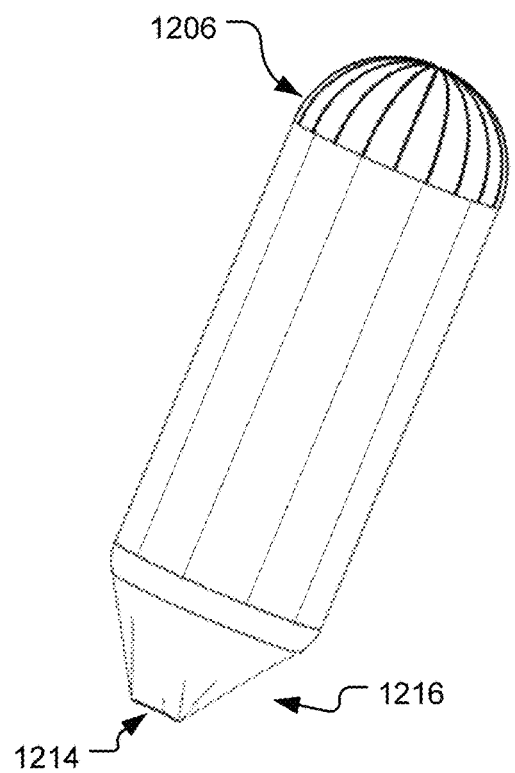
FIG. 12D illustrates an exemplary balloon construction phase following that of 12C.

FIG. 12D illustrates an exemplary balloon construction phase following that of 12C. In this phase, a second end 1216 of the balloon is uniquely folded, such as in the manner shown with respect to FIG. 2, to create areas that may serve as linkage points for attaching suspension arms of a payload-supporting cage. This folding is performed in such a way that the second end 1216 the balloon is left partially open so that there exists a vent 1214 that allows lift gas to escape during ascension of the balloon to a target altitude. During a flight termination sequence, the vent 1214 acts as a termination vent to rapidly release the lift gas when the reusable balloon is inverted, such as according to the manner shown and described with respect to FIG. 1A-1D.

The above specification, examples, and data provide a complete description of the structure and use of exemplary embodiments of the disclosed technology. Since many embodiments of the disclosed technology can be made without departing from the spirit and scope of the disclosed technology, the disclosed technology resides in the claims hereinafter appended. Furthermore, structural features of the different embodiments may be combined in yet another embodiment without departing from the recited claims.

What is claimed is:

1. A reusable balloon system comprising:
    a balloon with a first end supporting a payload and a second end opposite the first end, the second end including an aperture;
    an apex fitting positioned within the aperture of the second end of the balloon;
    a clamp that applies a pressure around the apex fitting to form an air-tight seal against the balloon at a perimeter of the aperture; and
    control circuitry that controllably initiates a descent sequence by removing the pressure from the clamp to release the apex fitting from the second end of the balloon.

2. The reusable balloon system of claim 1, wherein release of the apex fitting opens a folded portion of the balloon to enlarge the aperture to a size that is larger than a circumference of the apex fitting.

3. The reusable balloon system of claim 1, further comprising:
    a seal feature around the apex fitting; and
    a turn buckle configured to be selectively adjusted to tighten the clamp against the seal feature with a portion of the balloon between the clamp and the air-tight seal.

4. The reusable balloon system of claim 1, wherein the control circuitry includes a cutting mechanism that controllably releases the apex fitting from the second end of the balloon by severing a cord used to tighten the clamp around the apex fitting.

5. The reusable balloon system of claim 1, wherein the control circuitry is configured to:
    detect a geolocation of the reusable balloon system; and
    responsive to determining that the geolocation is external to a predefined geofence boundary, automatically release the apex fitting from the second end of the balloon.

6. The reusable balloon system of claim 1, wherein the clamp pinches a portion of the balloon inward against the apex fitting.

7. The reusable balloon system of claim 1, wherein the clamp includes a clamp ring.

8. The reusable balloon system of claim 7, wherein the clamp ring is tightened around a portion of the balloon while the balloon is inside out.

9. A method for launch and recovery of a reusable balloon system, the method comprising:
    receiving a lift gas within a balloon envelope, the balloon envelope having a first end attached to a payload and a plug seal formed in an aperture of a second end of the balloon envelope opposite the first end, the plug seal including an apex fitting and a clamp that applies a pressure to a portion of the balloon envelope forming a perimeter around the aperture to create an air-tight seal between the balloon envelope and the apex fitting; and
    initiating a descent sequence of the reusable balloon system by controllably releasing the pressure from the clamp to release the apex fitting from the second end of the balloon envelope.

10. The method of claim 9, wherein the plug seal further includes a rubber seal feature around the apex fitting and a turn buckle that is tightened to secure the clamp against the rubber seal feature with the portion of the balloon envelope in between.

11. The method of claim 9, wherein release of the apex fitting opens a folded portion of the balloon envelope to enlarge the aperture to a size that is larger than a circumference of the apex fitting.

12. The method of claim 9, wherein controllably releasing the pressure from the clamp further comprises:
    severing a cord used to tighten the clamp around the apex fitting.

13. The method of claim 9, wherein the method further comprises:
    detecting a geolocation of the reusable balloon system; and
    responsive to determining that the geolocation is external to a predefined geofence boundary, automatically releasing the pressure from the clamp.

14. The method of claim 9, wherein the descent sequence is automatically initiated in response to receipt of a radio frequency command.

15. The method of claim 9, wherein the clamp pinches the portion of the balloon envelope inward against the apex fitting.

16. A method for constructing a plug seal in a reusable balloon system comprising:
    positioning an apex fitting within an aperture formed in one end of a balloon envelope;
    positioning a portion of the balloon envelope forming a perimeter around the aperture between a clamp and the apex fitting; and
    securing the clamp against the portion of the balloon envelope to apply a pressure through the balloon envelope to the apex fitting and to form an air-tight seal around the perimeter, the apex fitting including control circuitry configured to controllably release the apex fitting while the reusable balloon system is in flight to initiate a descent sequence.

17. The method of claim 16, wherein a rubber seal feature is positioned around the apex fitting and the method further comprises:
    selectively tightening a turn buckle to secure the clamp against the rubber seal feature with the portion of the balloon envelope between the clamp and the rubber seal feature.

18. The method of claim 16, wherein the clamp includes a clamp ring.

19. The method of claim 16, wherein the method further comprises:
    turning the balloon envelope inside-out before securing the clamp against the portion of the balloon envelope; and
    securing the clamp against the portion of the balloon envelope while the balloon envelope is inside out.

20. The method of claim 16, wherein the descent sequence is automatically initiated in response to receipt of a radio frequency command.

\* \* \* \* \*